United States Patent
Zhu et al.

(10) Patent No.: US 10,666,315 B2
(45) Date of Patent: May 26, 2020

(54) SYNCHRONIZATION FOR TERMINAL-TO-TERMINAL COMMUNICATION

(71) Applicant: FUJITSU LIMITED, Kawasaki-shi, Kanagawa (JP)

(72) Inventors: Chenxi Zhu, Fairfax, VA (US); Hongyang Chen, Kawasaki (JP); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 493 days.

(21) Appl. No.: 14/908,475

(22) PCT Filed: Aug. 8, 2014

(86) PCT No.: PCT/US2014/050417
§ 371 (c)(1),
(2) Date: Jan. 28, 2016

(87) PCT Pub. No.: WO2015/026544
PCT Pub. Date: Feb. 26, 2015

(65) Prior Publication Data
US 2016/0191113 A1    Jun. 30, 2016

Related U.S. Application Data

(60) Provisional application No. 61/869,004, filed on Aug. 22, 2013.

(51) Int. Cl.
*H04B 1/7073* (2011.01)
*H04W 56/00* (2009.01)
*H04W 84/18* (2009.01)

(52) U.S. Cl.
CPC ........ *H04B 1/7073* (2013.01); *H04W 56/001* (2013.01); *H04W 56/0015* (2013.01); *H04W 84/18* (2013.01)

(58) Field of Classification Search
CPC .............. H04B 1/7073; H04W 56/001; H04W 56/0015; H04W 84/18
See application file for complete search history.

(56) References Cited

U.S. PATENT DOCUMENTS

| | | |
|---|---|---|
| 5,732,113 A | 3/1998 | Schmidt et al. |
| 5,790,939 A | 8/1998 | Malcolm et al. |
| 6,985,471 B1 | 1/2006 | Holma et al. |

(Continued)

*Primary Examiner* — Christine Ng
(74) *Attorney, Agent, or Firm* — Maschoff Brennan (57) ABSTRACT

In some embodiments, a terminal-to-terminal network may include one or more terminals each configured to receive a timing reference signal. The one or more terminals may be further configured to select a timing offset relative to a periodic transmission frame of the terminal-to-terminal network. The timing offset may be associated with a time relative to the periodic transmission frame at which a timing synchronization signal is broadcast. The timing synchronization signal may be based at least in part on the timing reference signal. The one or more terminals may be further configured to select a timing synchronization signal transmission rate. The one or more terminals may be further configured to broadcast the timing synchronization signal at the timing offset and at the timing synchronization signal transmission rate.

20 Claims, 3 Drawing Sheets

(56) References Cited

U.S. PATENT DOCUMENTS

| | | | | |
|---|---|---|---|---|
| 2004/0261094 | A1* | 12/2004 | Huslak | H04N 7/152 |
| | | | | 725/25 |
| 2009/0017851 | A1* | 1/2009 | Li | H04W 56/002 |
| | | | | 455/502 |
| 2009/0238130 | A1* | 9/2009 | Nakatsugawa | H04W 74/06 |
| | | | | 370/329 |
| 2012/0069944 | A1* | 3/2012 | Hadzic | H04J 3/0667 |
| | | | | 375/376 |
| 2013/0183905 | A1* | 7/2013 | Richardson | H04W 56/0015 |
| | | | | 455/67.11 |
| 2013/0301633 | A1* | 11/2013 | Brown | H04J 3/0647 |
| | | | | 370/350 |

\* cited by examiner

SYNCHRONIZATION FOR TERMINAL-TO-TERMINAL COMMUNICATION

FIELD

The embodiments discussed herein are related to synchronization for terminal-to-terminal communication.

BACKGROUND

Terminal-to-terminal communication may allow data transmissions to be made directly between two or more terminals of a telecommunication system. The terminal-to-terminal communication may overlay regular cellular communications, and may be performed with or without cellular network coverage.

In some instances, using terminal-to-terminal communication may increase network capacity. For example, terminal-to-terminal communication may permit spatial multiplexing, which may allow for higher relative spectrum usage. Employing terminal-to-terminal communication may also permit throughput between terminals to be increased if a terminal-to-terminal link experiences better channel quality than a cellular link. Using terminal-to-terminal communication may reduce resource usage when data is transmitted once between two terminals during a terminal-to-terminal transmission, as compared to transmitting the same data twice between the two terminals over a cellular link, e.g., once through an uplink (UL) transmission from a transmitting terminal to a base station and once through a downlink (DL) transmission to a receiving terminal from the base station.

Terminal-to-terminal communication may reduce communication latency of a telecommunication network. For example, terminal-to-terminal communication may not relay data through a base station and/or a core network, thus potentially reducing the transit time of the data and/or the load on the base station and/or the core network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a terminal-to-terminal network may include one or more terminals each configured to receive a timing reference signal. The one or more terminals may be further configured to select a timing offset relative to a periodic transmission frame of the terminal-to-terminal network. The timing offset may be associated with a time relative to the periodic transmission frame at which a timing synchronization signal is broadcast. The timing synchronization signal may be based at least in part on the timing reference signal. The one or more terminals may be further configured to select a timing synchronization signal transmission rate. The one or more terminals may be further configured to broadcast the timing synchronization signal at the timing offset and at the timing synchronization signal transmission rate.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may relate to a telecommunication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example telecommunication systems described. Rather, the embodiments described herein may also be applicable to other telecommunication systems.

Some embodiments may relate to synchronizing terminals for terminal-to-terminal communication in a telecommunication system. The terminal-to-terminal communication may occur with or without cellular network coverage.

Embodiments of the present invention will be explained with reference to the accompanying drawings.

Figure 1:
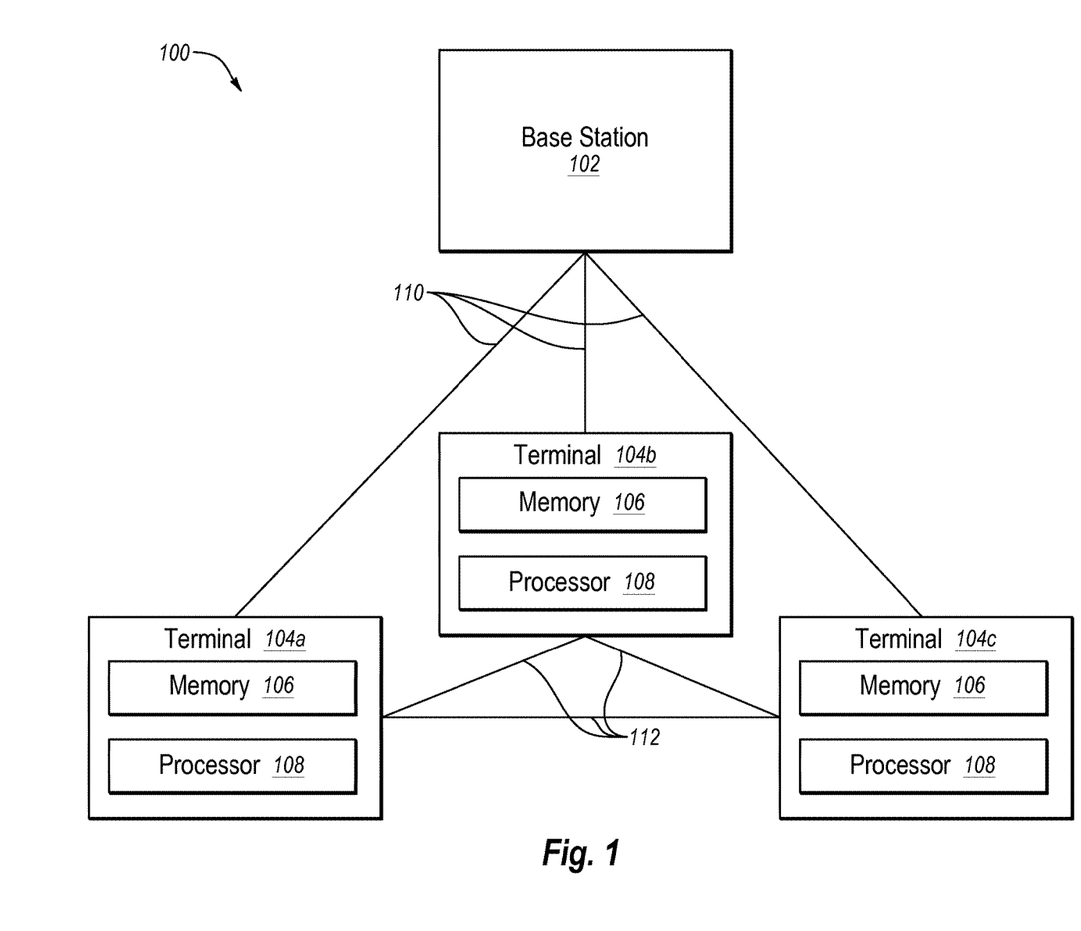
FIG. 1 is a diagram of an example telecommunication system.

FIG. 1 is a diagram of an example telecommunication system 100. In some embodiments, a network architecture of the telecommunication system 100 may include the network architecture of an Evolved Universal Mobile Telecommunications System (E-UMTS). The E-UMTS may include an LTE radio access network, for instance. The radio access network may include an E-UMTS Terrestrial Radio Access Network (E-UTRAN). However, other types of network architecture may alternately or additionally be used.

The telecommunication system 100 may include a base station 102. The base station 102 may include base station equipment, including hardware and/or software for radio communication with radio-communication-equipped nodes ("wireless nodes"). For example, the base station 102 may be equipped for radio communication 110 with wireless nodes such as terminal 104*a*, terminal 104*b*, and terminal 104*c* (collectively "terminals 104"). The base station 102 may generally allow the wireless nodes, including the terminals 104, to wirelessly communicate with each other and/or to wirelessly access a network (not shown) via radio communication 110 with the base station 102.

The base station 102 may include hardware and software for radio communication over a licensed spectrum. The licensed spectrum may generally include portions of a radio spectrum licensed for transmission of wireless data, such as cellular data. For example, the base station 102 may be configured to transmit cellular data that complies with an LTE radio access network, such as an LTE radio access network according to 3GPP LTE specification releases 8-12. The base station 102 may include an E-UTRAN NodeB (eNB) associated with LTE radio access networks.

The terminals 104 may include equipment configured to allow the terminals 104 to transmit and receive data via wireless communications via the licensed spectrum. For example, the terminals 104 may include hardware, such as one or more antennas for transmitting and receiving radio transmissions, and codecs. The terminals 104 may include mobile phones, tablet computers, laptop computers, and/or other electronic devices that may use radio communication. Alternately or additionally, the terminals 104 may include devices that employ machine-type communication (MTC). The terminals 104 may include user equipment (UE) associated with LTE radio access networks.

Each of the terminals 104 may include memory 106 and a processor 108. The memory 106 may include a non-transitory computer-readable medium. Instructions such as programming code executable by the processor 108 may be encoded in the memory 106. When the instructions are executed by the processor 108, the associated terminals 104a, 104b, and 104c may perform operations related to and/or including the processes described herein.

The terminals 104 may be equipped for terminal-to-terminal communication 112, which may include device-to-device (D2D) communication associated with LTE radio access networks. The terminal-to-terminal communication 112 may allow the terminals 104 to transmit and/or receive data among the terminals 104 without routing the data through the base station 102.

Figure 2:
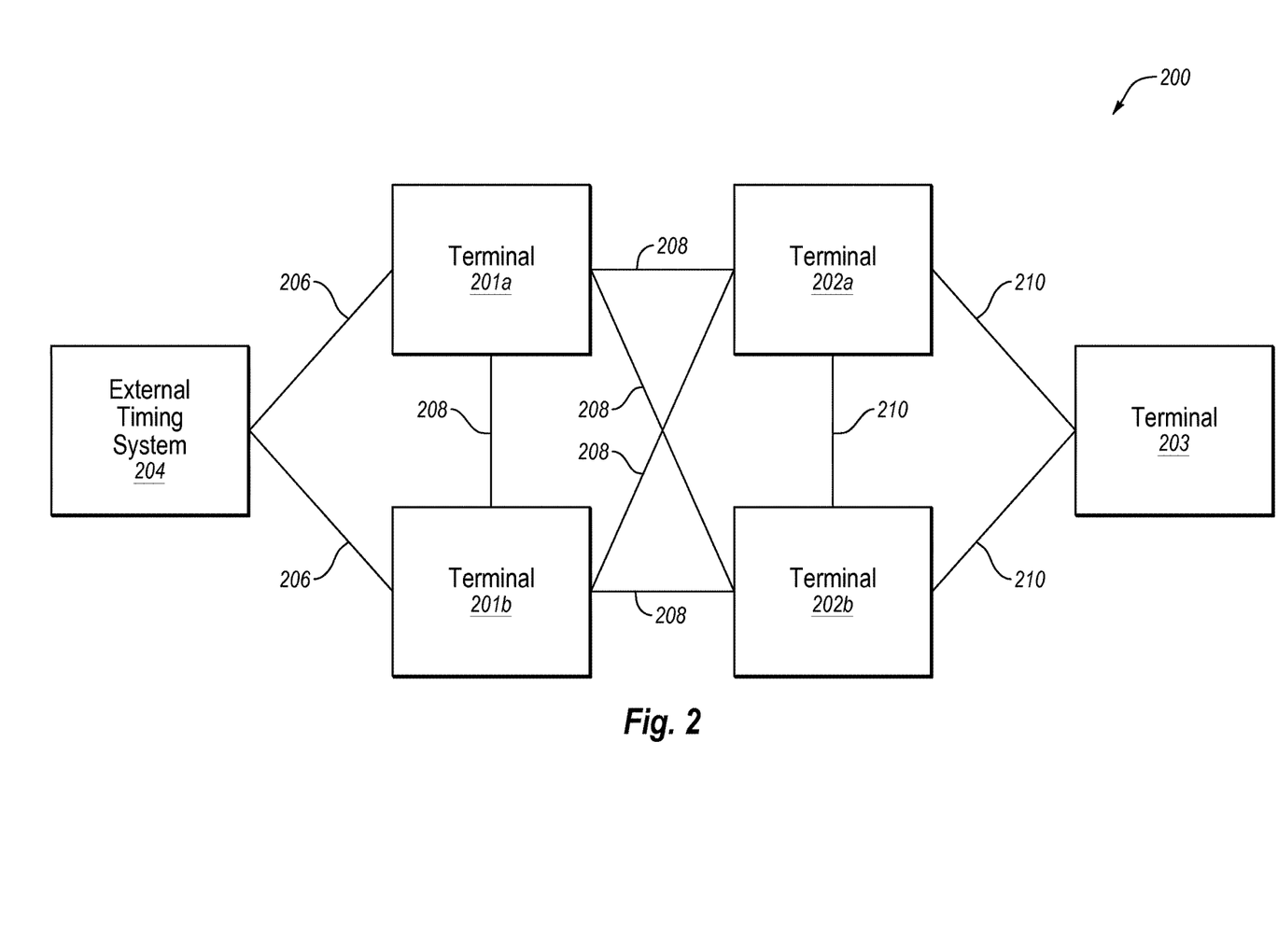
FIG. 2 is a diagram of an example terminal-to-terminal network.

FIG. 2 is a diagram of an example terminal-to-terminal network 200. The terminal-to-terminal network 200 may include a terminal 201a, a terminal 201b, a terminal 202a, a terminal 202b, and a terminal 203. The terminal 201a, the terminal 201b, the terminal 202a, the terminal 202b, and the terminal 203 may generally correspond to the terminals 104 of FIG. 1. In some embodiments, some or all of the terminal-to-terminal network 200 may be located outside of telecommunication network coverage, e.g., one or more of the terminal 201a, the terminal 201b, the terminal 202a, the terminal 202b, and the terminal 203 may be outside of the range of a base station, such as the base station 102 of FIG. 1.

The terminal 201a and the terminal 201b may receive an external timing reference signal 206 from an external timing system 204. The external timing system 204 may include a satellite-based and/or terrestrial-based navigation system such as the Global Positioning System (GPS), the Global Navigation Satellite System (GLONASS), the BeiDou-2 (a.k.a. COMPASS) Navigation Satellite System, the Galileo System, or the like or any combination thereof.

The terminal 202a, the terminal 202b, and the terminal 203 may not receive the external timing reference signal 206. For example, the terminal 202a, the terminal 202b, and/or the terminal 203 may be located in an area where the external timing reference signal 206 is too weak to use. Alternatively or additionally, the terminal 202a, the terminal 202b, and/or the terminal 203 may not include a receiver capable of receiving the external timing reference signal 206 or such a receiver may be switched off.

Terminals capable of receiving the external timing reference signal 206, such as the terminal 201a and the terminal 201b, may be described herein as root terminals.

The terminal 201a and the terminal 201b may transmit a timing synchronization signal such as a primary timing synchronization signal 208. The primary timing synchronization signal 208 may be based on the external timing reference signal 206. The external timing reference signal 206 may be described as a timing reference signal and the primary timing synchronization signal 208 may be described as a timing synchronization signal.

Alternatively or additionally, the primary timing synchronization signal 208 may be described herein as a synchronization signal 0 (SS0). The primary timing synchronization signal 208 may be transmitted with respect to a time of interest for the terminal-to-terminal network 200. For example, the primary timing synchronization signal 208 may be transmitted with respect to periodic transmission frames of the terminal-to-terminal network 200.

In some instances, the transmission frames of the terminal-to-terminal network 200 may be defined relative to the external timing reference signal 206. For example, the transmission frames may have a 10 milliseconds (ms) length defined relative to the external timing reference signal 206 according to the formula mod(external time, 10 ms)=0.

In some embodiments, the primary timing synchronization signal 208 may signal a relative timing with respect to beginnings of the transmission frames of the terminal-to-terminal network 200.

The primary timing synchronization signal 208 may be received by terminals that may not receive the external timing reference signal 206, such as the terminal 202a and the terminal 202b. The terminal 202a and the terminal 202b may use the primary timing synchronization signal 208 to synchronize to the transmission frames of the terminal-to-terminal network 200.

In some embodiments, if a terminal receives more than one primary timing synchronization signal 208, the terminal may synchronize to the transmission frames of the terminal-to-terminal network 200 using the strongest primary timing synchronization signal 208 received.

In some instances, the length of time a terminal may maintain timing synchronization with the transmission frames of the terminal-to-terminal network 200 without receiving a timing synchronization signal may depend on the accuracy of the terminal's internal local clock. By way of example, terminals such as the terminal 202a and the terminal 202b may maintain timing synchronization to the transmission frames of the terminal-to-terminal network 200 when the terminals receive a timing synchronization signal such as the primary timing synchronization signal 208 about every 40 ms or less. For example, in such instances, if transmission frames of the terminal-to-terminal network 200 are 10 ms in length, receiving a timing synchronization signal at least every fourth transmission frame may allow a terminal to maintain timing synchronization.

In some embodiments, the terminal-to-terminal network 200 may attempt to provide instances of the primary timing synchronization signal 208 at a target timing synchronization signal rate for a given area. For example, the target timing synchronization signal rate may include an average of 1 timing synchronization signal per 10 ms for the given area. Alternately, the target timing synchronization signal rate may include an average of 1 timing synchronization signal per 20 ms for the given area. Alternately, a different target timing synchronization signal rate may be used.

In some instances, if the terminal 201a and/or the terminal 201b broadcasts the primary timing synchronization signal 208 every 10 ms, the battery of the terminal 201a and/or the terminal 201b transmitting the primary timing synchronization signal 208 every 10 ms may drain quickly.

In some embodiments, the terminal 201a, the terminal 201b and/or other root terminals may collectively transmit the primary timing synchronization signal 208 at an average of once per 10 ms while individual terminals such as the terminal 201a and the terminal 201b may transmit less often than once every 10 ms.

In some embodiments, the terminal 201a and the terminal 201b may monitor instances of the primary timing synchronization signal 208 transmitted by other terminals to determine an average primary timing synchronization signal 208 instance per transmission frame and/or some other period of time. Alternately or additionally, the terminal 201a and the terminal 201b may determine an average length of time between instances of the primary timing synchronization signal 208, and/or other statistical measurements of the primary timing synchronization signal 208 instances over periods of time and/or transmission frames.

By way of example, the terminal 201a may adjust the rate at which the terminal 201a transmits the primary timing synchronization signal 208 based on a rate at which the primary timing synchronization signal 208 is observed relative to the target timing synchronization signal rate. For example, if the observed primary timing synchronization signal 208 rate is higher than the target timing synchronization signal rate, the terminal 201a may lower the rate at which the terminal 201a transmits the primary timing synchronization signal 208. If the observed primary timing synchronization signal 208 rate is lower than the target timing synchronization signal rate, the terminal 201a may increase the rate at which the terminal 201a transmits the primary timing synchronization signal 208.

In some embodiments, if the terminal 201a and the terminal 201b may communicate with one another using terminal-to-terminal communication, the terminal 201a and the terminal 201b may communicate to determine a coordinated transmission schedule for the primary timing synchronization signal 208 to meet the target timing synchronization signal rate.

When the terminal 201a is transmitting an instance of the primary timing synchronization signal 208, the terminal 201a may not be able to observe another instance of the primary timing synchronization signal 208 broadcast at the same time. For example, if the terminal 201a and the terminal 201b each transmit the primary timing synchronization signal 208 at the same time, the terminal 201a may not be able to observe that the terminal 201b is also transmitting the primary timing synchronization signal 208. Thus, the rate at which the primary timing synchronization signal 208 is observed by the terminal 201a may not reflect the rate at which the primary timing synchronization signal 208 is available to another terminal such as the terminal 202a.

In some embodiments, the terminal 201a may transmit instances of the primary timing synchronization signal 208 at a timing offset relative to a defined period such as the transmission frames of the terminal-to-terminal network 200. In some embodiments, a preset number of timing offsets may be defined relative to the transmission frames. For example, 10 timing offsets with a granularity of 1 ms may be defined relative to 10 ms transmission frames. Alternately, 5 timing offsets with a granularity of 2 ms may be defined relative to the 10 ms transmission frames. Alternately, a different number of timing offsets, a different granularity, and/or a different length transmission frame may be defined. In some embodiments, the timing offsets may be associated with subframes of the transmission frames.

The terminal 201a may select one of the timing offsets, broadcast an instance of the primary timing synchronization signal 208 at that timing offset, and monitor for other instances of the primary timing synchronization signal 208 at the other timing offsets. In some embodiments, the terminal 201a may select the timing offset randomly. Broadcasting the primary timing synchronization signal 208 at a timing offset and monitoring for instances of the primary timing synchronization signal 208 at other timing offsets may improve the accuracy of the observed primary timing synchronization signal 208 rate.

In some embodiments, each of the timing offsets may be associated with a different sequence. The sequences may be code division multiple access (CDMA) sequences. In some instances, CDMA sequences with good autocorrelation and crosscorrelation properties may be selected. The CDMA sequences may be defined in advance. The CDMA sequences may be easily detected using a time domain correlator.

The terminal 201a may select a timing synchronization signal transmission rate at which to broadcast the primary timing synchronization signal 208. The timing synchronization signal transmission rate may be longer than the length of the transmission frame such that the terminal 201a may transmit the timing synchronization signal at a rate of less than once per transmission frame. In some embodiments, the terminal 201a may transmit a timing synchronization signal at 10 ms, 20 ms, 40 ms, 80 ms, or 106 ms intervals. Alternately or additionally, the terminal 201a may transmit the timing synchronization signal at other interval lengths.

In some embodiments, the terminal 201a may receive a signal indicating a maximal timing synchronization signal transmission rate via a radio resource control (RRC) signal from a base station, a cluster head of a terminal-to-terminal cluster, or the like. Alternately or additionally, the terminal 201a may have a default timing synchronization signal transmission rate. The terminal 201a may use the maximal timing synchronization signal transmission rate, the default timing synchronization signal transmission rate, or some other timing synchronization signal transmission rate as an initial timing synchronization signal transmission rate.

In some embodiments, the initial timing synchronization signal transmission rate may be a relatively high transmission rate and the terminal 201a may back off from the initial timing synchronization signal transmission rate as warranted by the observed primary timing synchronization signal 208 transmission rate according to a backoff algorithm, which may be standards-based and/or implementation-based.

In some embodiments, the terminal 201a may select its initial timing synchronization signal transmission rate based on an observed primary timing synchronization signal 208 transmission rate from the terminal 201b and/or other terminals.

The terminal 202a and the terminal 202b may transmit a relayed timing synchronization signal 210 based on the primary timing synchronization signal 208. To describe the relationship between the primary timing synchronization signal 208 and the relayed timing synchronization signal 210, the primary timing synchronization signal 208 may be described as the timing reference signal and the relayed timing synchronization signal 210 may be described as the timing synchronization signal.

The relayed timing synchronization signal 210 may be described herein as a synchronization signal 1 (SS1). Transmission of the relayed timing synchronization signal 210 may generally correspond to the transmission of the primary timing synchronization signal 208 described above.

The relayed timing synchronization signal 210 may be received by terminals that may not receive the external timing reference signal 206 or the primary timing synchronization signal 208, such as the terminal 203. The terminal 203 may use the relayed timing synchronization signal 210 to synchronize the terminal 203 to the transmission frames of the terminal-to-terminal network 200.

In some embodiments, if a terminal receives both a primary timing synchronization signal 208 and a relayed timing synchronization signal 210, the terminal may synchronize using the primary timing synchronization signal 208.

In some embodiments, the terminal 203 may transmit a relayed timing synchronization signal (not shown) based on the relayed timing synchronization signal 210. Subsequent synchronization signals may be further relayed.

Figure 3:
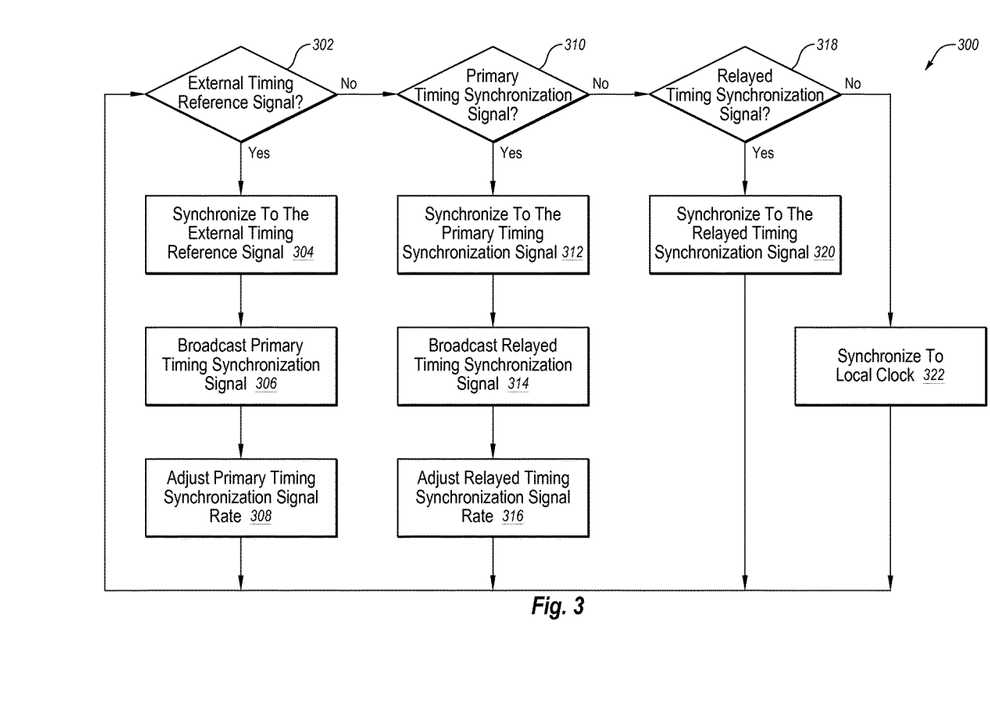
FIG. 3 is a flowchart of an example method.

FIG. 3 is a flowchart of an example method 300. The method 300 may be performed by a terminal, such as one or more of the terminals 104 of FIG. 1 and/or one or more of the terminal 201a, the terminal 201b, the terminal 202a, the terminal 202b, and the terminal 203 of FIG. 2.

In some instances, the method 300 may cause a terminal to maintain a timing synchronization to periodic transmission frames of a terminal-to-terminal network such that the terminal may communicate over the terminal-to-terminal network.

The method 300 may begin at block 302, where an attempt may be made to detect an external timing reference signal. The external timing reference signal may generally correspond to the external timing reference signal 206 of FIG. 2. If an external timing reference signal is detected, the method 300 may continue to block 304. If no external timing reference signal is detected, if the related circuitry is turned off, or if the external timing reference signal is too weak to use, the method 300 may continue to block 310.

At block 304, the method 300 includes synchronizing to the external timing reference signal.

At block 306, the method 300 optionally includes broadcasting a primary timing synchronization signal. The primary timing synchronization signal may generally correspond to the primary timing synchronization signal 208 of FIG. 2. The primary timing synchronization signal may be broadcast at a primary timing synchronization signal rate.

At block 308, the method 300 optionally includes adjusting the primary timing synchronization signal rate. In some embodiments, the primary timing synchronization signal rate may be adjusted based on monitoring primary timing synchronization signals from other sources. For example, if one other terminal is broadcasting the primary timing synchronization signal, each terminal may adjust its primary timing synchronization signal rate to half of a target timing synchronization signal rate and they may alternate broadcasts to collectively broadcast the primary timing synchronization signal at the target timing synchronization signal rate while preserving power. Alternately or additionally, the primary timing synchronization signal rate may be adjusted based on control signals from a base station, a cluster head, or the like.

At block 310, an attempt may be made to detect a primary timing synchronization signal. If a primary timing synchronization signal is detected, the method 300 may continue to block 312. If no primary timing synchronization signal is detected or if the primary timing synchronization signal is too weak to use, the method 300 may continue to block 318.

At block 312, the method 300 includes synchronizing to the primary timing synchronization signal.

At block 314, the method 300 optionally includes broadcasting a relayed timing synchronization signal. The relayed timing synchronization signal may generally correspond to the relayed timing synchronization signal 210 of FIG. 2. The relayed timing synchronization signal may be broadcast at a relayed timing synchronization signal rate.

At block 316, the method 300 optionally includes adjusting the relayed timing synchronization signal rate. In some embodiments, the relayed timing synchronization signal rate may be adjusted based on monitoring relayed timing synchronization signals from other sources. Alternately or additionally, the relayed timing synchronization signal rate may be adjusted based on control signals from a base station, a cluster head, or the like.

At block 318, an attempt may be made to detect a relayed timing synchronization signal. If a relayed timing synchronization signal is detected, the method 300 may continue to block 320. If no relayed timing synchronization signal is detected or if the relayed timing synchronization signal is too weak to use, the method 300 may continue to block 322.

At block 320, the method 300 includes synchronizing to the relayed timing synchronization signal.

At block 322, the method 300 includes synchronizing to a local clock. For example, a terminal may synchronize to its local clock.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A terminal-to-terminal network comprising:
one or more terminals, each configured to:
receive a timing reference signal;
select a timing offset relative to a periodic transmission frame of the terminal-to-terminal network, the timing offset associated with a time relative to the periodic transmission frame at which a timing synchronization signal is broadcast, the timing synchronization signal based at least in part on the timing reference signal;
select a timing synchronization signal transmission rate;
broadcast the timing synchronization signal at the timing offset and at the timing synchronization signal transmission rate;
monitor other timing synchronization signals to determine an average timing synchronization signal rate; and
adjust the synchronization signal transmission rate based at least in part on a comparison of the average timing synchronization signal rate and a target timing synchronization signal rate.

2. The terminal-to-terminal network of claim 1, wherein the timing synchronization signal includes a code division multiple access (CDMA) sequence of a plurality of CDMA sequences, each of the plurality of CDMA sequences associated with a different one of a plurality of timing offsets including the timing offset.

3. The terminal-to-terminal network of claim 1, the one or more terminals each further configured to select the timing offset randomly.

4. The terminal-to-terminal network of claim 1, wherein the timing synchronization signal transmission rate is 2, 4, 8, or 16 times a length of the periodic transmission frame.

5. The terminal-to-terminal network of claim 1, wherein the timing reference signal includes an external timing reference signal and the timing synchronization signal includes a primary timing synchronization signal.

6. The terminal-to-terminal network of claim 5, wherein the external timing reference signal includes a global positioning system (GPS) signal.

7. The terminal-to-terminal network of claim 1, wherein the timing reference signal is a primary timing synchronization signal and the timing synchronization signal includes a relayed timing synchronization signal.

8. The terminal-to-terminal network of claim 1, the one or more terminals each further configured to receive a maximal timing synchronization signal transmission rate.

9. A terminal-to-terminal network comprising:
one or more terminals, each configured to:
receive a timing reference signal;
select a timing offset relative to a periodic transmission frame of the terminal-to-terminal network, the timing offset associated with a time relative to the periodic transmission frame at which a timing synchronization signal is broadcast, the timing synchronization signal based at least in part on the timing reference signal;
select a timing synchronization signal transmission rate; and
broadcast the timing synchronization signal at the timing offset and at the timing synchronization signal transmission rate, wherein:
the periodic transmission frame includes a length of 10 milliseconds (ms),
the timing offset is 1 of 10 timing offsets defined relative to the periodic transmission frame, the 10 timing offsets including an offset granularity of 1 ms, and
the one or more terminals are each further configured to listen for other timing synchronization signals different from the timing synchronization signal at 9 of the 10 timing offsets during which the timing synchronization signal is not broadcast.

10. The terminal-to-terminal network of claim 9, wherein the timing synchronization signal includes a code division multiple access (CDMA) sequence of a plurality of CDMA sequences, each of the plurality of CDMA sequences associated with a different one of a plurality of timing offsets including the timing offset.

11. The terminal-to-terminal network of claim 9, wherein the timing synchronization signal transmission rate is 2, 4, 8, or 16 times a length of the periodic transmission frame.

12. The terminal-to-terminal network of claim 9, wherein the timing reference signal includes an external timing reference signal and the timing synchronization signal includes a primary timing synchronization signal.

13. The terminal-to-terminal network of claim 12, wherein the external timing reference signal includes a global positioning system (GPS) signal.

14. The terminal-to-terminal network of claim 9, wherein the timing reference signal is a primary timing synchronization signal and the timing synchronization signal includes a relayed timing synchronization signal.

15. The terminal-to-terminal network of claim 9, the one or more terminals each further configured to select the timing offset randomly.

16. A terminal-to-terminal network comprising:
one or more terminals, each configured to:
receive a timing reference signal;
select a timing offset relative to a periodic transmission frame of the terminal-to-terminal network, the timing offset associated with a time relative to the periodic transmission frame at which a timing synchronization signal is broadcast, the timing synchronization signal based at least in part on the timing reference signal;
select a timing synchronization signal transmission rate; and
broadcast the timing synchronization signal at the timing offset and at the timing synchronization signal transmission rate, wherein:
the one or more terminals select the timing offset from a plurality of timing offsets relative to a periodic 10-millisecond (ms) transmission frame of the terminal-to-terminal network, each of the plurality of timing offsets associated with a code division multiple access (CDMA) sequence of a plurality of CDMA sequences, the plurality of CDMA sequences each associated with a timing synchronization signal;
the timing synchronization signal transmission rate is associated with a 20 ms or higher transmission interval; and
the one or more terminals are further configured to:
broadcast the CDMA sequence associated with the selected timing offset during a first transmission frame;
monitor for the CDMA sequences not associated with the selected timing offset during the first transmission frame;
monitor for each of the plurality CDMA sequences during a second transmission frame;
broadcast the CDMA sequence associated with the selected timing offset during a third transmission frame;
monitor for the CDMA sequences not associated with the selected timing offset during the third transmission frame; and
select a new timing synchronization signal transmission rate based at least in part on a target timing synchronization signal rate and a CDMA sequence rate during one or more of the first transmission frame, the second transmission frame, and the third transmission frame.

17. The terminal-to-terminal network of claim 16, wherein the plurality of timing offsets include 10 timing offsets having a granularity of 1 ms.

18. The terminal-to-terminal network of claim 16, wherein the plurality of timing offsets include 5 timing offsets having a granularity of 2 ms.

19. The terminal-to-terminal network of claim 16, wherein the timing synchronization signal transmission rate is associated with a 20 ms transmission interval, a 40 ms transmission interval, an 80 ms transmission interval, or a 160 ms transmission interval.

20. The terminal-to-terminal network of claim 16, wherein each of the plurality of timing offsets is associated with a subframe of the first transmission frame, the second transmission frame, and the third transmission frame.

* * * * *